United States Patent [19]
Graham et al.

[11] Patent Number: 5,687,305
[45] Date of Patent: Nov. 11, 1997

[54] PROJECTION OF IMAGES OF COMPUTER MODELS IN THREE DIMENSIONAL SPACE

[75] Inventors: Michael Evans Graham, Albany; Weiping Wang, Schenectady, both of N.Y.; Paul Stanley Stephens, Sharonville, Ohio

[73] Assignee: General Electric Company, Schenectady, N.Y.

[21] Appl. No.: 631,043

[22] Filed: Apr. 12, 1996

Related U.S. Application Data

[63] Continuation of Ser. No. 217,813, Mar. 25, 1994, abandoned.

[51] Int. Cl.[6] .................................................. G06T 3/00
[52] U.S. Cl. ..................................... 395/125; 395/127
[58] Field of Search ........................ 395/119–20, 125, 395/127, 129, 133, 130

[56] References Cited

U.S. PATENT DOCUMENTS

| | | | |
|---|---|---|---|
| 5,161,013 | 11/1992 | Rylander et al. | 358/160 |
| 5,319,749 | 6/1994 | Haaker et al. | 395/166 |
| 5,325,473 | 6/1994 | Monroe et al. | 395/129 |
| 5,337,102 | 8/1994 | Winnek | 354/115 |
| 5,351,966 | 10/1994 | Tohyama et al. | 273/311 |
| 5,353,074 | 10/1994 | Jones et al. | 353/46 |
| 5,389,101 | 2/1995 | Heilbrun et al. | 606/130 |
| 5,398,684 | 3/1995 | Hardy | 128/653.1 |

OTHER PUBLICATIONS

Stevens, Tim, "Virtual reality: is it really real?" Industry Week, v242, n10, p30(5), May 17, 1993.

Kim et al, "Correspondence", IEEE Transactions on Robotics and Automation, vol 9 iss 5, pp698–702, 1993.

Bylinsky, Gene, "The marvels of 'virtual reality'" Fortune, v123, n11, p138(5), Jun. 3, 1991.

DeFanti, Thomas A. et al, "A 'Room' with a 'view', " IEEE Spectrum, pp. 30–33, (Oct. 1993).

Liang, Zhengrong, "An Efficient Three-Dimensional Unified Projector-Backprojector for SPECT Reconstruction," Nuclear Science Symposium and Medical Imaging Conference, pp. 1975–1979, (1991).

Primary Examiner—Joseph H. Feild
Assistant Examiner—Rudolph Buchel
Attorney, Agent, or Firm—David C. Goldman; Marvin Snyder

[57] ABSTRACT

A system and method for precisely superimposing images of computer models in three-dimensional space to a corresponding physical object in physical space. The system includes a computer for producing a computer model of a three-dimensional object. A projector means projects an image of the computer model onto the physical object. A spatial transformation accurately maps the computer model onto a projection stage at the projector which projects a formed image in a three-dimensional space onto the physical object in a one-to-one correspondence.

11 Claims, 4 Drawing Sheets

PROJECTION OF IMAGES OF COMPUTER MODELS IN THREE DIMENSIONAL SPACE

This application is a Continuation of application Ser. No. 08/217,813 filed Mar. 25, 1994, now abandoned.

BACKGROUND OF THE INVENTION

1. Field of the Invention

The present invention relates generally to computer modeling and more particularly to the interaction of computer models with real-world objects which the models represent.

2. Description of the Related Art

Geometric oriented models are typically generated in mathematical form by using computer aided design (CAD) devices or in digitized form obtained from 3-D computed tomography (CT) of x-ray or magnetic resonance imaging (MRI) devices. These geometric oriented models are not easily utilized and are often presented as print-outs, plots, or as graphics on video screens. Since the geometric oriented models are not superimposed upon the physical world to which the models are associated, it is difficult to fully comprehend the vast amount of data associated with the models and how the respective images are precisely located in relation to the physical world. Currently, there are several different devices for relating computerized data and images to real-world objects with which they are associated. For example, CRT displays, blueprints, plots, and printouts, as well as computerized numerical control (CNC) machinery and robotics devices are all used to relate computerized shapes and data to their real-world counterparts. Each of these devices, however, are insufficient to create the superimposition of the digital data and the real-world object which they represent. For example, the display methods require that the user's attention be shifted back and forth between the data display and the real-world object, and the data driven machinery methods only allow positioned data to be displayed one location at a time forcing the user to visualize the entire context. For geometry intensive applications, a better way of linking the computer model to the object is needed.

SUMMARY OF THE INVENTION

In order to avoid the problems associated with the above-mentioned devices, the present invention discloses a system that superimposes three-dimensional images from computer models or from a three-dimensional database to a corresponding physical object with a one-to-one correspondence. With the present invention, edges, contours, curves, points, assembly instructions, rulings, tooling marks, dimensions, and tolerances, can be superimposed accurately onto an existing physical object, without having to use a mechanical means. This system enables humans to see what could not be seen previously in applications such as engineering design, manufacturing processes, surgical operations, architectural/interior design, and entertainment-like businesses. In engineering design applications, the present invention can be used to better visualize and understand the performance of designs as they function in the actual environment. For manufacturing processes, the visual enhancement associated with the present invention helps improve manufacturing efficiency and quality with in-process dimensional accuracy check. In assembly operations, the locations of components can be highlighted for complicated assembly jobs. For surgical procedures, the present invention can help doctors visualize humans "through-the-skin" as the image of internal organs is recreated and projected on a visible layer of skin or other tissue. As a result, surgical or other intervening procedures can be planned and performed more precisely and these plans may be projected directly onto the site of surgery. In entertainment-type applications, the present invention can help bring together computer generated virtual reality and the physical world.

Therefore, it is a primary objective of the present invention to provide a system for superimposing three-dimensional images of computer models to a corresponding physical object in the same physical space, eliminating the disjointedness between the model and the physical world.

Another object of the present invention is to provide a system that allows rapid comparison of the physical object to the computer model.

Still another object of the present invention is to provide a system that enables hidden features on an object to be visualized as they are projected onto the object surface.

Yet another object is to provide a system that enables humans to see what could not be seen previously in applications such as engineering design, manufacturing processes, surgical operations, architectural/interior design, and entertainment-like businesses.

Thus, in accordance with the present invention, there is provided a system for superimposing three-dimensional images of computer models onto real world instances of those models. The system comprises a producing means for generating a computer model of a three-dimensional object containing geometric oriented information. A projecting means projects and generates an image of the computer model to the instance. A transforming means transforms the computer model from the producing means to the projecting means in real time. The transforming means formulates coordinate transformations between the computer model and the instance by arbitrarily selecting a plurality of points from the computer model and a plurality of corresponding points from the instance and tracing back from the plurality of points from the instance to the corresponding points from the model to derive a transformation factor.

While the present invention will hereinafter be described in connection with a preferred embodiment and method of use, it will be understood that it is not intended to limit the invention to this embodiment. Instead, it is intended to cover all alternatives, modifications and equivalents as may be included within the spirit and scope of the present invention as defined by the appended claims.

DETAILED DESCRIPTION OF THE PRESENT INVENTION

Figure 1:
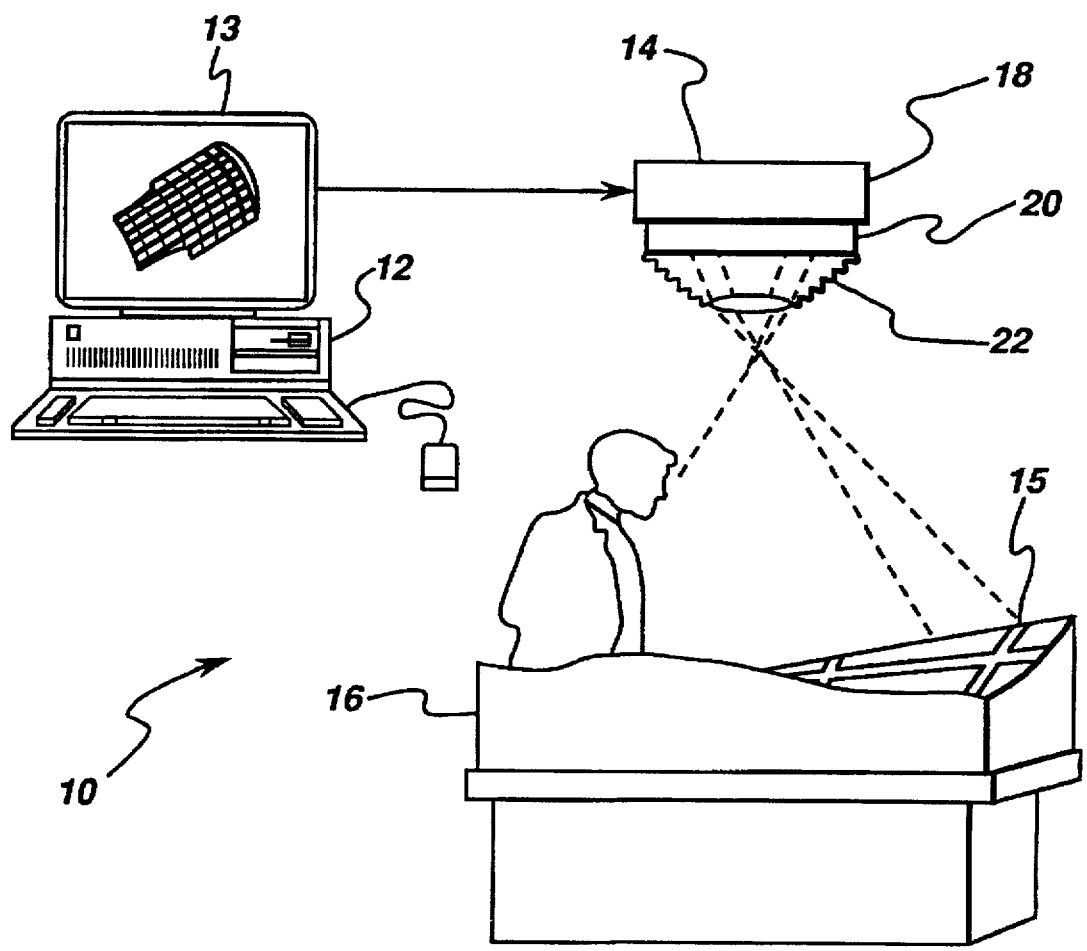
FIG. 1 is a diagram of a system used in the present invention for superimposing three-dimensional images of computer models to an object.

FIG. 1 shows a system 10 for superimposing three-dimensional images of computer models onto real world instances of the models (i.e. a physical object). The system includes a computer 12 for generating a computer model 13 of a three-dimensional object containing geometric oriented information, a projection means 14 controlled by the computer for generating and projecting an image 15 of the computer model to a physical object 16 that corresponds precisely to the computer model. The computer is preferably a personal computer or a work station that generates computer models of three-dimensional objects containing geometric information. The computer uses known three-dimensional hardware and software that enables users to generate models of basic shapes or primitives, such as cubes and spheres as well as lathed and extruded shapes, and offers features such as lofting, sweeping, and vertex-leveling editing of the model. In addition, the computer is capable of accessing a database (not shown) of spatial data generated from sources such as CT scans of X-rays and MRI or the like. The projection means 14 is connected to the computer through a network and includes a light source 18 for emitting a beam of light, a projection stage 20 for receiving the beam of light and transferring a three-dimensional image 15 of the computer model to the object, and an optical means 22 (i.e. a series of optical devices such as lenses and mirrors) for directing the image of the computer model to the object. The projection stage 20 is a computer controlled LED, CRT, LCD panel, an opaque projector, photographic slide holder, or the like. However, the projection stage does not have to be computer controlled, and can be a slide projector, overhead projector, where a laser printer, or a mechanical plotter is linked to the computer so that a graphical hardcopy is produced. If non-computer controlled devices are used, then xerographic or other photographic means are used to scale and transfer the result to the transparent or reflective media chosen for the projection stage.

Figure 2:
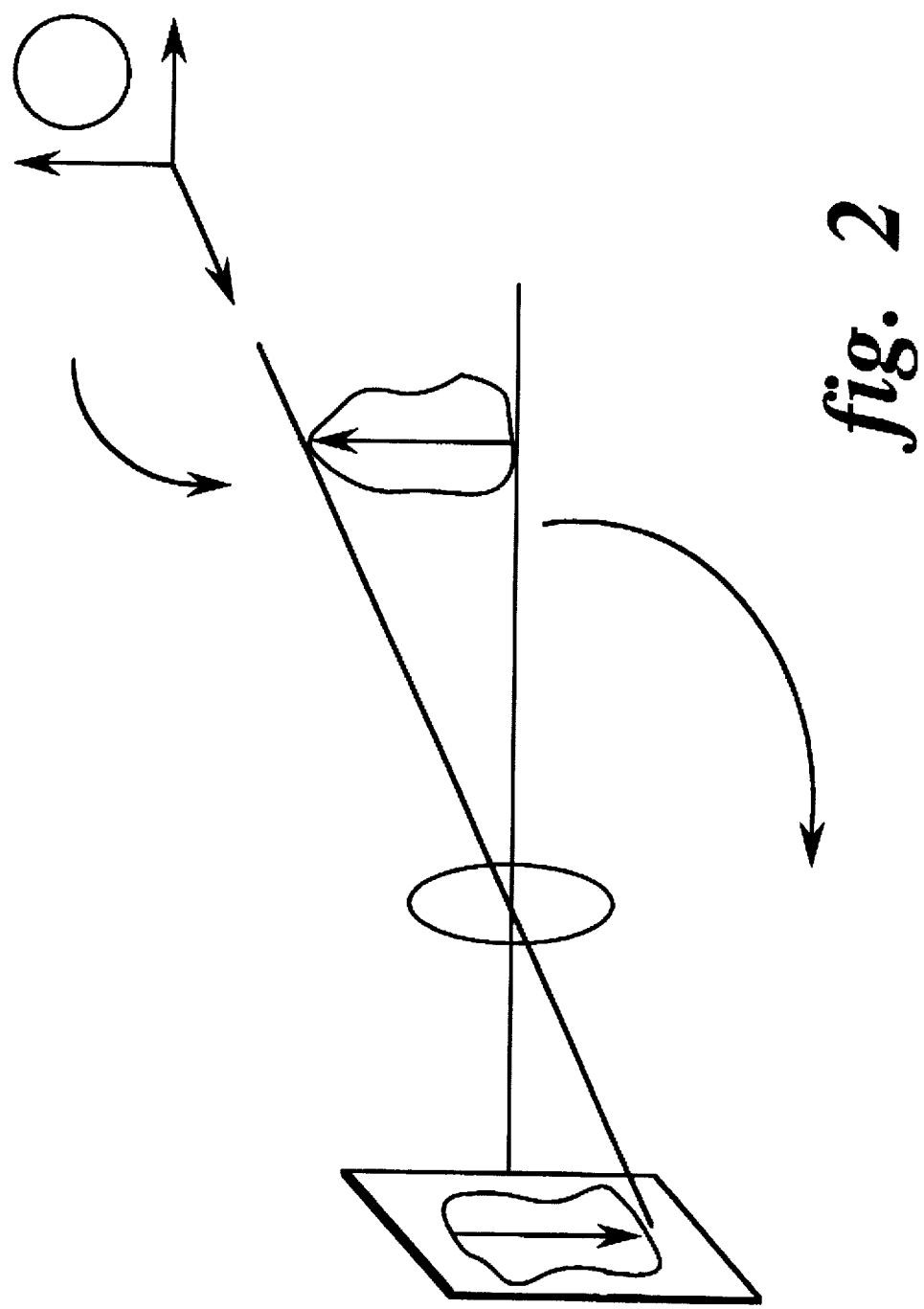
FIG. 2 is a schematic of a homogeneous coordinate transformation used in the present invention.

In the present invention, the physical object 16 does not require any special setup or position registering with the computer generated model. In particular, the computer generated model and the physical object are linked by a spatial transform which maps individual points in real time from the model to the projection stage 20 so that the image of the model is projected accurately onto the physical object with a one-to-one correspondence. The spatial transformation is formulated by the computer which uses a homogeneous coordinate system as shown in FIG. 2. In the homogeneous coordinate system of FIG. 2, a transformation T is taken between a model space $X_m$, an object space $X_o$, and an image space $X_i$ on the projection stage using cartesian coordinates of a point (x,y,z) that are represented by (xw, yw, zw, w), wherein w is a scalar factor. The transformation T includes the transformation $T_1$ from the model space $X_m$ to the object space $X_o$ and the transformation $T_2$ from the object space $X_o$ to the image on the stage $X_i$. The transformation T rotates, scales, reflects, and shears the computer model to the object in the object space using the coordinates formulated for $T_1$ and $T_2$. The coordinates formulated for $T_1$ and $T_2$ are represented by equations 1–3 set forth below.

$$T_1 * X_m = X_o \qquad \text{Equation (1)}$$

and $$T_2 * X_o = X_i \qquad \text{Equation (2)}$$

wherein, $X_m$, $X_o$, and $X_i$ are vectors of dimension 4 and $T_1$ and $T_2$ are 4×4 matrices.

Substituting equation (1) into equation (2) yields $T_2 * T_1 * X_m = X_i$ wherein $T_2 * T_1$ is a 4×4 matrix and substituting T for $T_2 * T_1$, the transformation T from the model space to the image space can be represented by another 4×4 matrix set forth below.

$$T * X_m = X_i \qquad \text{Equation (3)}$$

Figure 3:
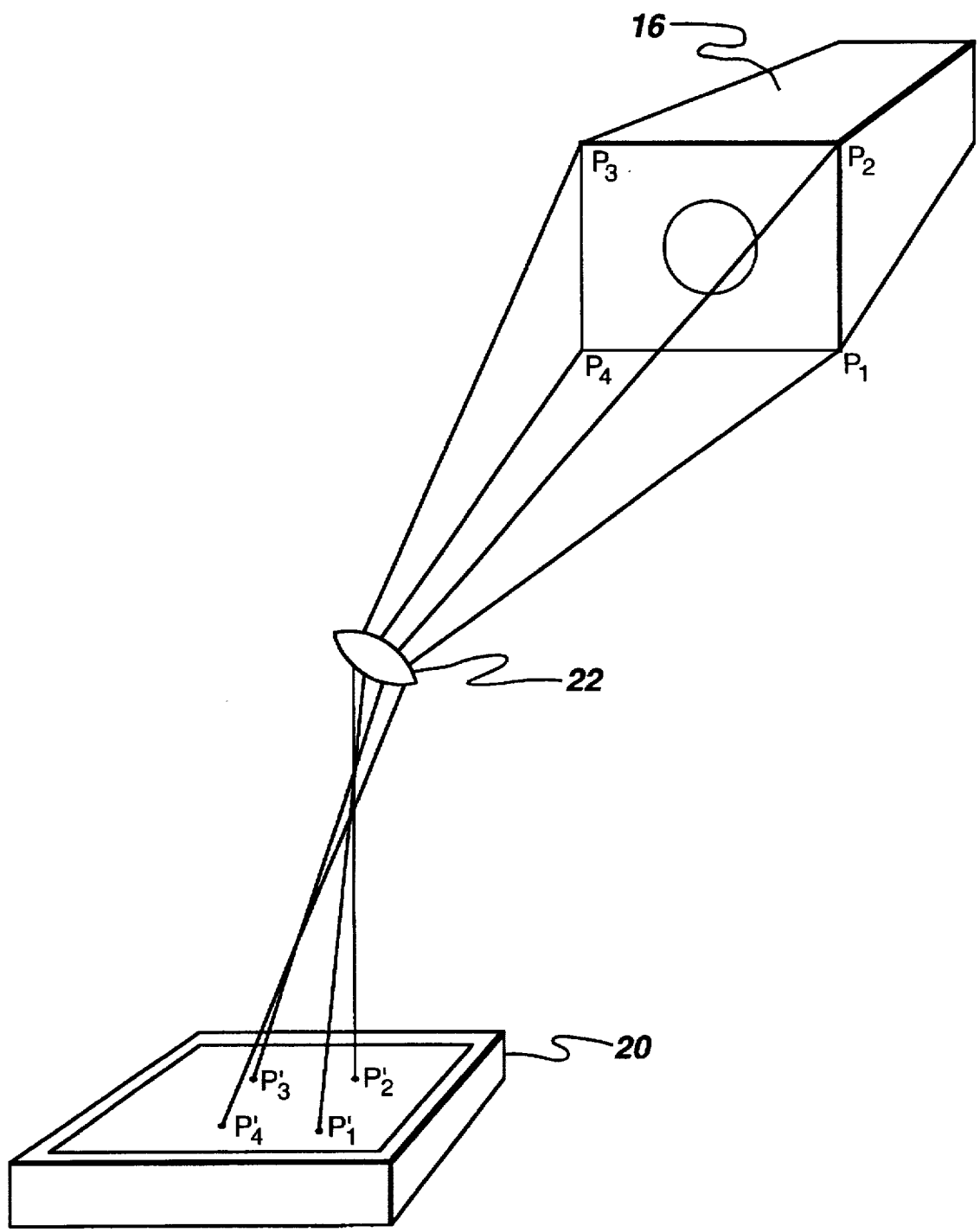
FIG. 3 is a schematic of the alignment of the superimposed computer model to the object.

In order to determine T, 16 unknown variables have to be determined. The unknowns are solved by arbitrarily selecting four sets of points P1, P2, P3, P4 in the model and four corresponding sets of points in the object. The four points on the object are traced back to their corresponding points P1', P2', P3', and P4' in the image of the projection stage as shown in FIG. 3.

Using equation (3) for the first set of points P1 and P1', the following matrix is derived:

$$\begin{vmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{vmatrix} * \begin{vmatrix} w_1 x_1 \\ w_1 y_1 \\ w_1 z_1 \\ w_1 \end{vmatrix} = \begin{vmatrix} w_1' x_1' \\ w_1' y_1' \\ w_1' z_1' \\ w_1' \end{vmatrix}$$

Four equations that are obtained by carrying out the matrix multiplication are as follows:

$$a_{11} w_1 x_1 + a_{12} w_1 y_1 + a_{13} w_1 z_1 + a_{14} w_1 = w_1' x_1'$$

$$a_{21} w_1 x_1 + a_{22} w_1 y_1 + a_{23} w_1 z_1 + a_{24} w_1 = w_1' y_1'$$

$$a_{31} w_1 x_1 + a_{32} w_1 y_1 + a_{33} w_1 z_1 + a_{34} w_1 = w_1' z_1'$$

$$a_{41} w_1 x_1 + a_{42} w_1 y_1 + a_{43} w_1 z_1 + a_{44} w_1 = w_1'$$

Similarly, for P2 and P2'; P3 and P3'; and P4 and P4'; 12 additional equations are derived as follows:

$$a_{11} w_2 x_2 + a_{12} w_2 y_2 + a_{13} w_2 z_2 + a_{14} w_2 = w_2' x_2'$$

$$a_{21} w_2 x_2 + a_{22} w_2 y_2 + a_{23} w_2 z_2 + a_{24} w_2 = w_2' y_2'$$

$$a_{31} w_2 x_2 + a_{32} w_2 y_2 + a_{33} w_2 z_2 + a_{34} w_2 = w_2' z_2'$$

$$a_{41} w_2 x_2 + a_{42} w_2 y_2 + a_{43} w_2 z_2 + a_{44} w_2 = w_2'$$

$$a_{11} w_3 x_3 + a_{12} w_3 y_3 + a_{13} w_3 z_3 + a_{14} w_3 = w_3' x_3'$$

$$a_{21} w_3 x_3 + a_{22} w_3 y_3 + a_{23} w_3 z_3 + a_{24} w_3 = w_3' y_3'$$

$$a_{31} w_3 x_3 + a_{32} w_3 y_3 + a_{33} w_3 z_3 + a_{34} w_3 = w_3' z_3'$$

$$a_{41} w_3 x_3 + a_{42} w_3 y_3 + a_{43} w_3 z_3 + a_{44} w_3 = w_3'$$

$$a_{11} w_4 x_4 + a_{12} w_4 y_4 + a_{13} w_4 z_4 + a_{14} w_4 = w_4' x_4'$$

$$a_{21} w_4 x_4 + a_{22} w_4 y_4 + a_{23} w_4 z_4 + a_{24} w_4 = w_4' y_4'$$

$$a_{31} w_4 x_4 + a_{32} w_4 y_4 + a_{33} w_4 z_4 + a_{34} w_4 = w_4' z_4'$$

$$a_{41} w_4 x_4 + a_{42} w_4 y_4 + a_{43} w_4 z_4 + a_{44} w_4 = w_4'$$

The 16 unknowns a11, a12, . . . , a44 from the above linear equations are used to determine T. These 16 equations represent four sets of four equations with four unknowns. The four sets are solved independently as simultaneous linear equations Once the transformation factor T is obtained, any points in the computer model data can be transformed to their image location on the projection stage 20. More specifically, using the computer, each point in the computer model is multiplied by T, transforming an image of the model to the object in real time. The transformation factor eliminates the time consuming steps of precisely aligning and setting up the location of individual model features or other geometric image characteristics that are located in the model as is necessary for conventional systems. In the present invention, only one setup is required. After the setup, anything can projected from the model to the object.

In order to set up the system 10, the object 16 is placed within the operating range of the system as shown in FIG. 3 and if necessary the optical means 22 is adjusted so that the object is positioned within the depth of field of the projection. In particular, four points (P1, P2, P3, P4) on the object are selected and marked for easy identification. Using optical reciprocity, the plurality of points are traced back through the optical means to locate their respective image (P1', P2', P3', P4') on the projection stage 20 and used to derive the transformation factor T. These points are not necessarily fixed and more points although not necessary, can be used to determine T. If a selected point is hidden due to the motion of the object, a new point may be substituted so that it is observable by the optical means 22.

Figure 4:
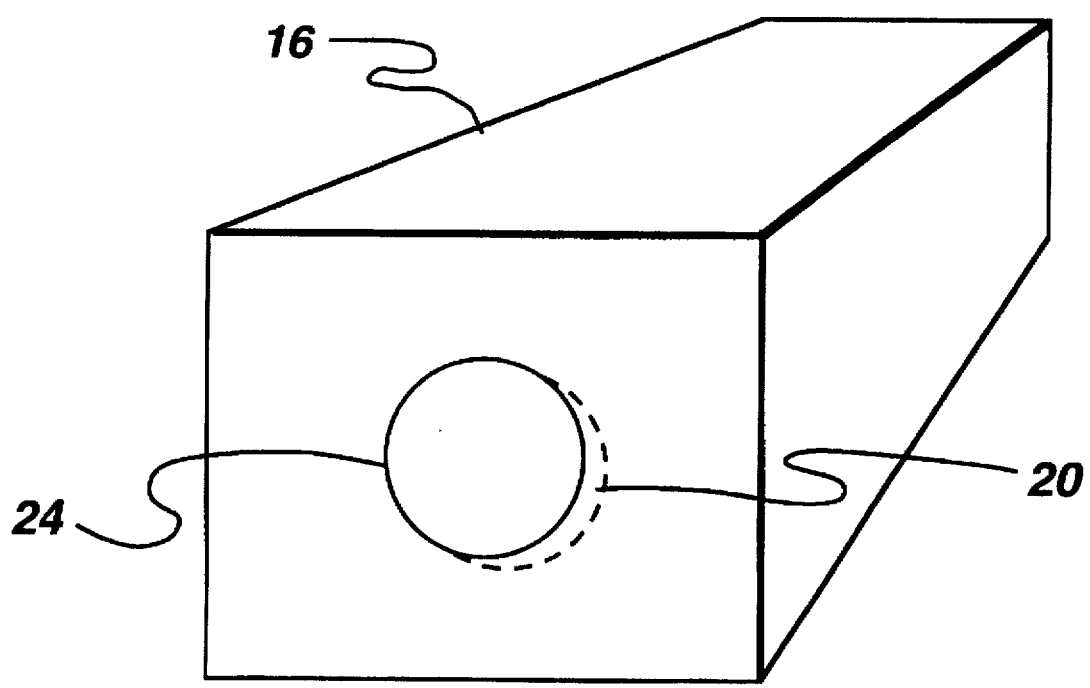
FIG. 4 is a schematic of an image from a computer model being superimposed onto a physical object.

After tracing back the points and determining T, the computer model is transformed to the projection means 14 which projects the three-dimensional image of the model to the object. In order to display the features from the computer model onto the projection stage 20, the features are digitized from the model. In the case of discretized or spatial data generated from imaging sources such as a MRI or a CT, the data can be used directly. Then the three-dimensional model is transformed to coordinates on the projection stage using the derived transformation factor T. A beam of light is emitted from the light source 18 to the projection stage, wherein a computer generated image is then projected upon the real world object 16 as a three-dimensional image 15. If desired, the image can be further processed by an intensity amplification system. The image is then passed through the optical means 22 which includes lenses and mirrors. The features of the computer model are then projected onto the physical object in their correct location and orientation. FIG. 4 shows a computer model of a three-dimensional image 26 superimposed upon the object 16 (i.e. a manufactured part) having a hole 24 therein. In this example, the hole 24 is off-center and should be manufactured at the location of the projected image 26.

As described earlier, the present invention has utility in many different applications such as engineering design, manufacturing processes, surgical operations, architectural/interior design, and entertainment-like businesses. In engineering design applications, the present invention can be used to better visualize and understand the performance of designs as they function in the actual environment. In manufacturing process applications, the visual enhancement associated with the present invention helps improve manufacturing efficiency and quality with in-process dimensional accuracy check. In assembly operation applications, the locations of components can be highlighted for complicated assembly jobs. For surgical procedures, the present invention can help doctors visualize humans "through-the-skin" as the image of internal organs is recreated and projected on a visible layer of skin or other tissue. As a result, surgical or other intervening procedures can be planned and performed more precisely and these plans maybe projected directly on the site of the surgery. In entertainment-type applications, the present invention can help bring together computer generated virtual reality and the physical world.

It is therefore apparent that there has been provided in accordance with the present invention, a method and system for superimposing images of computer models in three-dimensional space that fully satisfy the aims and advantages and objectives hereinbefore set forth. The invention has been described with reference to several embodiments. However, it will be appreciated that variations and modification can be effected by a person of ordinary skill in the art without departing from the scope of the invention.

We claim:

1. A system for superimposing a three-dimensional image of a computer model onto a real world instance of the model, comprising:

means for producing a computer model of a three-dimensional object containing geometric oriented information;

projection means for generating and projecting an image of the computer model to the real world instance; and means for transforming the computer model from the producing means to the projection means in real time, wherein individual points located on the computer model are mapped to the projection means, wherein an image of the computer model is projected accurately onto the real world instance with a one-to-one correspondence by formulating a coordinate transformation between the computer model and the real world instance, the coordinate transformation formulated by arbitrarily selecting a plurality of points located on the computer model and a plurality of corresponding points located on the real world instance and relating the plurality of points from the real world instance to the corresponding points located on the computer model to derive a transformation factor, wherein the transformation factor is a 4×4 matrix, the transforming means using the transformation factor to project the image of the computer model accurately onto the real world instance with a one-to-one correspondence.

2. A system according to claim 1, wherein the transformation factor is used for rotating, scaling, reflecting, and shearing the computer model to the real world instance in the physical space.

3. A system according to claim 1, wherein an optical means is used for tracing back the plurality of points from the real world instance to the corresponding points from the model.

4. A system according to claim 1, wherein the computer model of a three-dimensional image is in mathematical form.

5. A system according to claim 4, further comprising means for digitizing the mathematical image.

6. A system according to claim 1, wherein the computer model of a three-dimensional image is in digitized form.

7. A system according to claim 1, wherein the projecting means comprises a light source for emitting a beam of light; a projection stage for receiving the beam of light and the generated image and reflecting the image to the real world instance; and optical means for directing the image to the real world instance.

8. A system for superimposing three-dimensional images of computer models to a corresponding three-dimensional physical object, comprising:

means for producing a computer model of a three-dimensional object containing geometric oriented information;

projection means for generating and projecting an image of the computer model to the three-dimensional object, the projecting means comprising a light source for emitting a beam of light; a projection stage for receiving the beam of light and the generated image and reflecting the image to the three-dimensional object; and an optical means for directing the image to the three-dimensional object; and means for transforming the computer model from the producing means to the projection means in real time, wherein individual points located on the computer model are mapped to the projection means, wherein an image of the computer model is projected accurately onto the three-dimensional object with a one-to-one correspondence by formulating a coordinate transformation between the computer model and the three-dimensional object by arbitrarily selecting a plurality of points located on the computer model and a plurality of corresponding points located on the three-dimensional object and relating the plurality of points from the three-dimensional object to their respective image on the projection stage to corresponding points from the computer model to derive a transformation factor, wherein the transformation factor is a 4×4 matrix, the transforming means using the transformation factor to project the image of the computer model accurately onto the three-dimensional object with a one-to-one correspondence.

9. A system according to claim 8, wherein the transformation factor is used for rotating, scaling reflecting, and shearing the computer model to the three-dimensional object in the physical space.

10. A system for precisely superimposing three-dimensional images of computer models to a corresponding three-dimensional object, comprising:

means for producing a computer model of a three-dimensional object containing geometric oriented information;

projection means for generating and projecting an image of the computer model to the three-dimensional object, the generating and projecting means comprising a light source for emitting a beam of light; a projection stage for receiving the beam of light and the generated image and reflecting the image to the three-dimensional object; and an optical means for directing the image to the three-dimensional object; and means for spatially transforming the computer model from the producing means to the projection means in real time, wherein individual points located on the computer model are mapped to the projection means, wherein an image of the computer model is projected accurately onto the three-dimensional object with a one-to-one correspondence by formulating a coordinate transformation between the computer model and the three-dimensional object by arbitrarily selecting a plurality of points located on the computer model and a plurality of corresponding points located on the three-dimensional object and relating the plurality of points from the three-dimensional object to their respective image on the projection stage to corresponding points from the computer model to derive a transformation factor, wherein the transformation factor is a 4×4 matrix, the spatially transforming means using the transformation factor to project the image of the computer model accurately onto the three-dimensional object with a one-to-one correspondence, the transformation factor used to rotate, scale, reflect, and shear the computer model of three-dimensional images to the three-dimensional object in the physical space.

11. A method for superimposing a three-dimensional images of computer models from a computer model producing means to a corresponding three-dimensional object using a projection means, comprising the steps of:

producing a computer model of a three-dimensional object containing geometric oriented information;

formulating coordinate transformation points between the computer model and the three-dimensional object;

arbitrarily selecting a plurality of points located on the computer model and a plurality of corresponding points located on the three-dimensional object;

relating the plurality of points located on the three-dimensional object to their respective image in the projection means to corresponding points located on the computer model to derive a transformation factor used to project the image of the computer model accurately onto the three-dimensional object with a one-to-one correspondence, wherein the transformation factor is a 4×4 matrix;

using the transformation factor to rotate, scale, reflect, and shear the computer model to the three-dimensional object in the physical space; and projecting an image of the transformed computer model from the projection means to the three-dimensional object with a one-to-one correspondence.

* * * * *